US009789445B2

United States Patent
Lane et al.

(10) Patent No.: US 9,789,445 B2
(45) Date of Patent: Oct. 17, 2017

(54) COMPOSITE OXYGEN ION TRANSPORT MEMBRANE

(71) Applicants: Jonathan A. Lane, Snyder, NY (US); Zigui Lu, East Amherst, NY (US); Pawel J. Plonczak, Buffalo, NY (US)

(72) Inventors: Jonathan A. Lane, Snyder, NY (US); Zigui Lu, East Amherst, NY (US); Pawel J. Plonczak, Buffalo, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 107 days.

(21) Appl. No.: 14/853,157

(22) Filed: Sep. 14, 2015

(65) Prior Publication Data

US 2016/0096150 A1 Apr. 7, 2016

Related U.S. Application Data

(60) Provisional application No. 62/060,789, filed on Oct. 7, 2014.

(51) Int. Cl.
*B01D 53/22* (2006.01)
*B01D 71/02* (2006.01)
(Continued)

(52) U.S. Cl.
CPC ......... *B01D 71/024* (2013.01); *B01D 53/228* (2013.01); *B01D 69/02* (2013.01);
(Continued)

(58) Field of Classification Search
CPC ...... B01D 69/12; B01D 69/148; B01D 71/44; B01D 71/80; B01D 71/02; B01D 71/26;
(Continued)

(56) References Cited

U.S. PATENT DOCUMENTS 2,593,507 A 4/1952 Wainer
2,692,760 A 10/1954 Flurschutz
(Continued)

FOREIGN PATENT DOCUMENTS

EP 0 663 231 A2 7/1995
EP 0926096 A1 6/1999
(Continued)

OTHER PUBLICATIONS

M.F. Lu et al., Thermomechanical transport and anodic properties of perovskite-type (LaSr) CrFe0, Journal of Power Sources, Elsevier SA, CH, vol. 206, Jan. 15, 2012, pp. 59-69, XP028403091.
(Continued)

*Primary Examiner* — Anthony Shumate
(74) *Attorney, Agent, or Firm* — Ralph J. Mancini

(57) ABSTRACT

A composite oxygen ion transport membrane having a dense layer, a porous support layer, an optional intermediate porous layer located between the porous support layer and the dense layer and an optional surface exchange layer, overlying the dense layer. The dense layer has electronic and ionic phases. The ionic phase is composed of scandia doped, yttrium or cerium stabilized zirconia. The electronic phase is composed of a metallic oxide containing lanthanum, strontium, chromium, iron and cobalt. The porous support layer is composed of zirconia partially stabilized with yttrium, scandium, aluminum or cerium or mixtures thereof. The intermediate porous layer, if used, contains the same ionic and electronic phases as the dense layer. The surface exchange layer is formed of an electronic phase of a metallic oxide of lanthanum and strontium that also contains chromium, iron and cobalt and an ionic phase of scandia doped zirconia stabilized with yttrium or cerium.

10 Claims, 1 Drawing Sheet

(51) Int. Cl.
*B01D 69/02* (2006.01)
*B01D 69/12* (2006.01)
*B01D 69/10* (2006.01)
*C01B 13/02* (2006.01)
*B01D 67/00* (2006.01)

(52) U.S. Cl.
CPC .............. *B01D 69/10* (2013.01); *B01D 69/12* (2013.01); *C01B 13/0255* (2013.01); *B01D 67/0046* (2013.01); *B01D 2325/023* (2013.01); *B01D 2325/04* (2013.01); *B01D 2325/26* (2013.01)

(58) Field of Classification Search
CPC .... B01D 71/48; B01D 71/56; B01D 2325/04; B01D 2325/20; B29C 47/0007; B29C 47/0021; B29C 47/06; B29C 47/78; B29C 47/8805; B29C 47/90; B29C 47/904; B29K 2023/12; B29K 2077/00; B29K 2995/0065; B29L 2009/00; B29L 2031/712; B29L 2031/755; B32B 27/32; B32B 27/34; B32B 2250/24; B32B 2307/724; B32B 2553/00
See application file for complete search history.

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| RE37,134 E | 4/2001 | Wilson |
| 6,214,066 B1 | 4/2001 | Nataraj et al. |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |

(56) References Cited

U.S. PATENT DOCUMENTS

| | | |
|---|---|---|
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 6,191,573 B1 | 11/2013 | Garing et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1* | 10/2007 | Besecker ............ B01D 53/228 96/11 |
| 2007/0289215 A1 | 12/2007 | Hemmings et al. |
| 2007/0292342 A1 | 12/2007 | Hemmings et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1* | 1/2010 | Ekiner ............... B01D 53/228 95/54 |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0067210 A1* | 3/2012 | Sane ................. B01D 71/022 95/51 |
| 2012/0288439 A1 | 11/2012 | Sundaram et al. |
| 2012/0294783 A1 | 11/2012 | Palamara et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2013/0258000 A1* | 10/2013 | Ohashi ................ B41J 2/1629 347/71 |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |

(56) References Cited

U.S. PATENT DOCUMENTS

| | | | |
|---|---|---|---|
| 2014/0231351 A1* | 8/2014 | Wickramasinghe | B01D 69/148 210/652 |
| 2014/0319424 A1 | 10/2014 | Chakravarti et al. | |
| 2014/0319427 A1 | 10/2014 | Chakravarti et al. | |
| 2014/0323597 A1 | 10/2014 | Stuckert et al. | |
| 2014/0323598 A1 | 10/2014 | Chakravarti et al. | |
| 2014/0323599 A1 | 10/2014 | Chakravarti et al. | |
| 2015/0098872 A1 | 4/2015 | Kelly et al. | |
| 2015/0226118 A1 | 8/2015 | Kelly et al. | |
| 2015/0328582 A1 | 11/2015 | Joo et al. | |
| 2016/0001221 A1* | 1/2016 | Lu | C04B 38/02 422/222 |
| 2016/0118188 A1* | 4/2016 | Wada | H01G 4/30 361/301.4 |
| 2016/0155570 A1* | 6/2016 | Shimada | H01G 4/1227 361/301.4 |

FOREIGN PATENT DOCUMENTS

| | | |
|---|---|---|
| EP | 0984500 A2 | 3/2000 |
| EP | 0989093 A2 | 3/2000 |
| EP | 1504811 A1 | 2/2005 |
| EP | 1743694 A1 | 1/2007 |
| EP | 2 873 451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 700 | 4/1973 |
| GB | 1348375 | 3/1974 |
| WO | WO 97/41060 | 11/1997 |
| WO | WO 9741060 | 11/1997 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007/092844 A2 | 8/2007 |
| WO | WO 2007086949 | 8/2007 |
| WO | WO 2008/024405 A2 | 2/2008 |
| WO | WO 2009/027099 | 3/2009 |
| WO | WO 2010052641 A2 | 5/2010 |
| WO | WO 2011083333 A1 | 7/2011 |
| WO | WO 2011121095 S2 | 10/2011 |
| WO | WO 2012118730 | 9/2012 |
| WO | WO 2013009560 A1 | 1/2013 |
| WO | WO 2013062413 A1 | 5/2013 |
| WO | WO 2013/089895 A1 | 6/2013 |
| WO | WO 2014/074559 A1 | 5/2014 |
| WO | WO 2014/077531 A1 | 5/2014 |
| WO | WO 2014107707 A1 | 7/2014 |
| WO | WO 2014176022 A1 | 10/2014 |

OTHER PUBLICATIONS

Jian-jun Liu, Tong Liu, Wen-dong Wang, Jian-feng Gao, Chu-sheng Chen; Zr0.84Y0.16O1.92—La0.8Sr0.2Cr0.5Fe0.5O3-δ dual-phase composite hollow fiber membrane targeting chemical reactor applications; Journal of Membrane Science 389 (2012) 435-440.

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010, 85 pgs.

Zhu et al.; Development of Interconnect Materials for Solid Oxide Fuel Cells; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. Jpowsour. 2009. 02. 093.

The U.S. Department of Energy, "Evaluation of Fossil Fuel Power Plants with CO2 Recovery", Final Report (Feb. 2002), 134 pgs.

The U.S. Department of Energy—Office of Fossil Energy and U.S. Department of Energy/NETL, "Evaluation of Innovative Fossil Fuel Power Plants with CO2 Removal", Interim Report (Dec. 2000), 145 pgs.

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedmann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Babcock & Wilcox, Steam 40, "Sulfur Dioxide Control" (1992), pp. 35-1-35-15.

Okawa et al., Trial Design for a CO2 Recovery Power Plant by Burning Pulverized Coal in O2/CO2, Energy Convers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

* cited by examiner

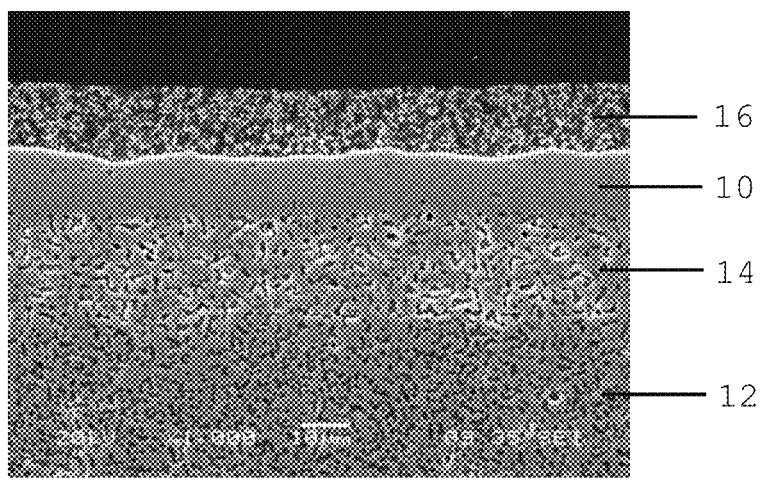

COMPOSITE OXYGEN ION TRANSPORT MEMBRANE

RELATED APPLICATIONS

This application claims the benefit of U.S. Provisional Application Ser. No. 62/060,789, filed on Oct. 7, 2014 which is incorporated herein by reference.

FIELD OF THE INVENTION

The present invention relates to a composite oxygen ion transport membrane in which a dense layer having electronic and ionic conducting phases is supported on a porous support layer. More particularly, the present invention relates to such a composite oxygen ion transport membrane in which the electronic phase is a cobalt containing perovskite-like metallic oxide, the ionic phase is a stabilized zirconia and the porous support layer is formed of a partially stabilized zirconia.

BACKGROUND

Composite oxygen ion transport membranes have been proposed for a variety of uses that involve the production of essentially pure oxygen by separation of oxygen from an oxygen containing feed through oxygen ion transport through such membrane. For example, each membrane can be used in combustion devices to support oxy-fuel combustion or for partial oxidation reactions involving the production of a synthesis gas.

In such membranes, the oxygen ion transport principally occurs within a dense layer that allows both oxygen ions and electrons transport at elevated temperatures. The oxygen from an oxygen containing feed ionizes on one surface of the membrane and the resultant oxygen ions are driven through the dense layer and emerge on the opposite side thereof to recombine into elemental oxygen. In the recombination, electrons are liberated and are transported back through the membrane to ionize the oxygen.

Such membranes can employ two phases, an ionic phase to conduct the oxygen ions and an electronic phase to conduct the electrons. In order to minimize the resistance of the membrane to the ionic transport, such membranes are made as thin as practical and are supported on porous support layers. The resulting composite oxygen transport membrane can be fabricated as a planar element or as a tube in which the dense layer is situated either on the inside or the outside of the tube.

An example of a composite oxygen ion transport membrane is disclosed in U.S. Pat. No. 5,240,480 that has a dense layer supported on two porous layers. The dense layer can be formed of an ionic conducting phase that contains yttrium stabilized zirconia and an electronic conducting phase that is formed from platinum or another noble metal. The porous layer adjacent to the dense layer is active and is capable of conducting oxygen ions and electrons. The other porous layer can be yttrium stabilized zirconia or calcium-stabilized zirconia.

U.S. Pat. No. 5,478,444 discloses a two-phase material capable of transporting oxygen ions and electrons. The oxygen ion conducting phase can be a metallic cerium oxide incorporating an yttrium stabilizer and a dopant that can be iron or cobalt. The electronic conducting phase is a perovskite that contains lanthanum, strontium, magnesium and cobalt or lanthanum, strontium cobalt and iron.

U.S. Pat. No. 5,306,411 discloses a dual-phase membrane having an ionic conducting phase formed from $Sc_2O_3$-stabilized zirconia. The electronic conducting phase can be a perovskite material containing, for example lanthanum, strontium, irons, chromium and cobalt. The resultant dense layer can be supported on an yttria-stabilized zirconia.

U.S. Pat. No. 7,556,676 discloses a dual-phase membrane having an ionic conducting fluorite phase formed of Sc-doped zirconia and an electronic conducting perovskite phase containing lanthanum, strontium, chromium, iron, and a small amount of vanadium. The dense membrane is supported on a thick 3 mol % yttria-stabilized zirconia (3YSZ) substrate. To densify the vanadium-containing perovskite, a reducing atmosphere of hydrogen and nitrogen must be used. The dense membrane also has two optional layers: a porous fuel oxidation layer to reduce the electrochemical resistance for fuel oxidation and a porous layer on the air side to facilitate oxygen reduction to oxygen ions. The main problems with this membrane are its low oxygen flux and fast degradation of oxygen flux during long-term operation. The low flux and fast degradation might be related to the membrane fabrication process in reducing environment under which the perovskite phase may react with zirconia to form an electrically insulating third phase and densification of both fuel oxidation and air reduction layers.

To address these problems, U.S. Pat. No. 8,795,417 B2 discloses a dual-phase oxygen transport membrane consisting of a vanadium-free perovskite phase and Sc-doped zirconia phase supported on a thick 3YSZ substrate. The perovskite phase which contains lanthanum, strontium, chromium, iron and no vanadium is densified by sintering in air at temperatures from 1400 to 1430° C. The sintering process in air eliminates the formation of an electrically insulating third phase and reduces the fabrication cost. A porous fuel oxidation layer is formed from a calcium-containing perovskite and a doped zirconia. The fuel oxidation layer made of calcium-containing perovskites is more refractory and therefore, tends to have a more stable microstructure during high-temperature operation. However, one problem with this oxygen transport membrane is that the 3YSZ porous support after high temperature sintering experiences phase transformation from tetragonal to monoclinic when stored at room temperature in ambient air. The phase transformation is accompanied by about 5% volume increase and results in cracking of the porous support or delamination of the coating from the porous support.

As will be discussed the present invention provides a composite oxygen ion transport membrane that incorporates materials to enable fabrication to be accomplished in a more cost effective manner than in the prior art. Also, the present membrane is more durable than prior art membranes by avoiding the detrimental tetragonal-to-monoclinic phase transformation of the porous support. Furthermore, the materials used in all three active layers are similar in composition so the shrinkage of each layer is closely matched during membrane fabrication, results in minimal residual stress. The current oxygen transport membrane also exhibits improved oxygen flux and reduced degradation of oxygen flux during long term operation due to the inherent properties of the composition of the dense separation layer, fuel oxidation layer, and surface exchange layer and the fabrication process.

SUMMARY OF THE INVENTION

The present invention may be characterized as a composite oxygen ion transport membrane comprising a dense separation layer having an electronic phase and an ionic phase and a porous support layer. The electronic phase and ionic phase in the dense separation layer exhibit a close thermal expansion match to each other and minimal chemical expansion so that the dense separation layer remains dense after multiple thermal cycles or after exposure to an oxygen chemical potential gradient. Furthermore, the dense separation layer and porous support layer exhibit a close thermal expansion match to each other and minimal chemical expansion so that the dense separation layer and porous support layer remain strongly adhered after multiple thermal cycles or after exposure to an oxygen chemical potential gradient. In addition, the porous support layer is formulated from a composition that does not undergo a phase transition at low temperatures during reactor cool-down or storage at ambient conditions. This eliminates the problem with prior art materials where a phase transition of the porous support layer, and concurrent volume expansion of the material, at ambient conditions causes the dense separation layer to delaminate from the porous support layer or causes the porous support layer to crack. The electronic phase of the dense layer comprises $(La_{1-x}Sr_x)_wCr_{1-y-z}Fe_yCo_zO_{3-\delta}$, where x is from about 0.1 to about 0.3, w is from about 0.93 to about 1.0, y is from about 0.15 to about 0.45, z is from about 0.03 to about 0.1, and $\delta$ renders the compound charge neutral; whereas the ionic phase of the dense layer comprises $Zr_{1-x'}Sc_{x'}A_{y'}O_{2-\delta}$, where x' is from about 0.1 to about 0.22, y' is from about 0.01 to about 0.04, and A is Y or Ce or mixtures of Y and Ce. The porous support layer is formed of $Zr_{1-x''}A_{x''}O_{2-\delta}$, where x'' is from about 0.05 to about 0.13, A is Y or Sc or Al or Ce or mixtures of Y, Sc, Al, and Ce.

There are many advantages of the materials used in the present invention over the prior art. A principal advantage of the present invention is that all the perovskite materials used in the active layers have very similar compositions and their thermal expansion is closely matched to that of the ionic conducting phase. Furthermore, all materials have limited chemical expansion and this is particularly important for the perovskite chosen for the electronic phase of the dense layer. In this regard, the use of such perovskite is particularly advantageous as opposed to a metal in that a noble metal would have to be used to prevent oxidation. The obvious problem with the use of a noble metal is one of expense. Furthermore, the support is particularly robust due to the use of a partially stabilized zirconia composition that does not experience a phase transition from tetragonal-to-monoclinic at ambient temperature.

In some embodiments of the present invention, a porous intermediate layer can be provided between the dense layer and the porous support layer. Such porous intermediate layer can also be comprised of the electronic phase and the ionic phase similar to that of the dense layer.

Furthermore, a surface exchange layer, overlying the dense layer can be provided so that the dense layer is located between the surface exchange layer and the porous intermediate layer and wherein the surface exchange layer comprises an electronic conductor and an ionic conductor. The electronic conductor of the surface exchange layer preferably comprises $(La_{1-x'''}Sr_{x'''})_{w'''}Cr_{1-y'''-z'''}Fe_{y'''}Co_{z'''}O_{3-\delta}$, where x''' is from about 0.1 to about 0.3, w''' is from about 0.93 to about 1, y''' is from about 0.25 to about 0.45, z''' is from about 0.03 to about 0.1, and $\delta$ renders the compound charge neutral. The ionic conductor of the surface exchange layer further comprises $Zr_{1-x^{iv}}^{iv}Sc_{x^{iv}}^{iv}A_{y^{iv}}^{iv}O_{2-\delta}$, where $x^{iv}$ is from about 0.1 to about 0.22, $y^{iv}$ is from about 0.01 to about 0.04, and A is Y or Ce.

Preferably, the ionic phase constitutes from about 35 percent to 65 percent by volume of each of the dense layer and the intermediate porous layer, with the remainder comprising the electronic phase materials. More preferably, the ionic phase constitutes from about 50 percent to 60 percent by volume of the dense layer and about 40 percent by volume of the intermediate porous layer. Similarly, the ionic conductor comprises from about 35 percent to 65 percent by volume of the surface exchange layer, and more preferably about 40 percent by volume of the surface exchange layer.

In selected embodiments, an electronic phase of the dense layer is $(La_{0.8}Sr_{0.2})_{0.95}Cr_{0.7}Fe_{0.25}Co_{0.05}O_{3-\delta}$ while the ionic phase is $Zr_{0.802}Sc_{0.180}Y_{0.018}O_{2-\delta}$. The porous support layer is preferably formed of $Zr_{0.923}Y_{0.077}O_{2-\delta}$. The surface exchange layer, if used, preferably includes an ionic conductor comprising $Zr_{0.809}Sc_{0.182}Ce_{0.009}O_{2-\delta}$ and an electronic conductor comprising $(La_{0.8}Sr_{0.2})_{0.95}Cr_{0.7}Fe_{0.25}Co_{0.05}O_{3-\delta}$. In a particularly preferred embodiment of the present invention, the porous intermediate layer has a thickness from about 10 microns to about 30 microns, an average pore size from about 0.1 microns to about 1 micron, and a porosity from about 25 percent to about 50 percent. In one embodiment, the porous support layer can have a thickness from about 0.7 mm to about 2.5 mm, an average pore size from about 0.5 microns to about 3 microns, and a porosity from about 25 percent to about 50 percent. The surface exchange layer can have a thickness from about 10 microns to about 25 microns, an average pore size from about 0.1 microns to about 1 micron, and a porosity from about 25 percent to about 50 percent.

It is to be noted, that as used herein and in the claims, the term "pore size" means average pore diameter as determined by quantitative stereological line intersection analysis. In addition, the term "dense" layer means a layer in which the ceramic layer has no connected through porosity.

BRIEF DESCRIPTION OF THE DRAWING

FIG. 1 is a SEM micrograph of a cross-section of a composite oxygen ion transport membrane of the present invention.

DETAILED DESCRIPTION

With reference to the sole FIGURE, an oxygen ion transport membrane 1 of the present invention is illustrated. Oxygen ion transport membrane 1 has a dense layer 10 supported on a porous support 12. Optional intermediate porous layer 14 and a surface exchange layer 16 can be provided.

Dense layer 10 functions to separate oxygen from an oxygen containing feed exposed to one surface of the oxygen ion transport membrane 10 and contains an electronic and ionic conducting phases. As discussed above, the electronic phase of $(La_{1-x}Sr_x)_wCr_{1-y-z}Fe_yCo_zO_{3-\delta}$, where x is from about 0.1 to about 0.3 and w is from about 0.93 to about 1 and y is from about 0.15 to about 0.45, z is from about 0.03 to about 0.1. The ionic phase is $Zr_{1-x'-y'}Sc_{x'}A_{y'}O_{2-\delta}$, where x' is from about 0.1 to about 0.22, y' is from about 0.01 to about 0.04 and A is Y or Ce or a mixture of Y and Ce. The porous support layer 12 is formed of $Zr_{1-x''}A_{x''}O_{2-\delta}$, where x'' is from about 0.05 to about 0.13, A is Y or Sc or Al or Ce or mixtures thereof.

Oxygen ion transport membrane 1 is specifically designed to be used in connection with oxy-fuel combustion applications as well as applications involving chemical reactions. The application of the present invention is not, however, limited to such uses. In applications involving fuel combustion, the use of intermediate porous layer 14 enhances the rate of fuel oxidation at that interface by providing a high surface area where fuel can react with oxygen or oxygen ions under the formation of partial or complete oxidation products. The oxygen ions diffuse through the mixed conducting matrix of this intermediate porous layer 14 towards the porous support 12 and react with the fuel that diffuses inward from the porous support 12 into this porous intermediate layer 14. Preferably, porous intermediate layer 14 is formed from the same electronic and ionic phases as dense layer 10.

Any embodiment can incorporate advantageously a surface exchange layer 16 that overlies the dense layer opposite to the porous intermediate layer 14 if the same is used. Surface exchange layer 16 enhances the oxygen surface exchange rate by enhancing the surface area of the dense layer 10 while providing a path for the resulting oxygen ions to diffuse through the mixed conducting oxide phase to the dense layer 10 and for oxygen molecules to diffuse through the open pore space to the same. The surface exchange layer 16 therefore, reduces the loss of oxygen chemical potential driving force due to the surface exchange process and thereby increases the achievable oxygen flux. As indicated above, it can also be a two-phase mixture containing an electronic conductor composed of $(La_{1-x'''}Sr_{x'''})_{w'''}Cr_{1-y'''-z'''}Fe_{y'''}Co_{z'''}O_{3-\delta}$, where $x'''$ is from about 0.1 to about 0.3, $w'''$ is from about 0.93 to 1, $y'''$ is from about 0.15 to 0.45, $z'''$ is from about 0.03 to 0.15 and $\delta$ renders the compound charge neutral and an ionic conductor composed of $Zr_{1-x^{iv}-y^{iv}}Sc_{x^{iv}}A_{y^{iv}}O_{2-\delta}$, where $x^{iv}$ is from about 0.1 to about 0.22, $y^{iv}$ is from about 0.01 to about 0.04 and A is Y or Ce or Al or mixtures thereof.

In a particularly preferred embodiment of the present invention, the dense layer 10 incorporates an electronic phase composed of $(La_{0.8}Sr_{0.2})_{0.95}Cr_{0.7}Fe_{0.25}Co_{0.05}O_{3-\delta}$ and an ionic phase composed of $Zr_{0.802}Sc_{0.180}Y_{0.018}O_{2-\delta}$. In such embodiment, the porous support layer 12 is formed of $Zr_{0.923}Y_{0.077}O_{2-\delta}$ and the surface exchange layer incorporates an ionic conductor composed of $Zr_{0.809}Sc_{0.182}Ce_{0.009}O_{2-\delta}$ and an electronic conductor composed of $(La_{0.8}Sr_{0.2})_{0.95}Cr_{0.7}Fe_{0.25}Co_{0.05}O_{3-\delta}$. Preferably, the porous intermediate layer 14 has a thickness from about 10 microns to about 30 microns, an average pore size from about 0.1 microns to about 1 microns and a first porosity from about 25 percent to about 50 percent. Porous support layer 12 has a thickness from about 0.7 mm to about 2.5 mm, an average pore size from about 0.5 microns to about 3 microns and a porosity from about 25 percent to about 50 percent. The surface exchange layer 16 has a thickness from about 10 microns to about 25 microns, an average pore size from about 0.1 microns to about 1 microns and a porosity from about 25 percent to about 50 percent.

As an example of fabricating an oxygen transport membrane element of the present invention, a porous support layer 12 is first fabricated from yttrium stabilized zirconia powder having a chemical formula of $Zr_{0.923}Y_{0.077}O_{2-\delta}$ (hereinafter, 4YSZ) The particle size of such powder is $d_{50}$=0.6 μm (about a 50 percentile of the particles have a particle size of below 0.6 μm.) The powder is then mixed with carbon black having a particle size of a $d_{50}$ from about 0.1 to about 1 μm and Poly(methyl methacrylate) (PMMA) having a particle size of a $d_{50}$ of about 1.5 um. The mixture contains about 9 percent carbon black, 19 percent PMMA and a remainder of the yttrium stabilized zirconia powder. Binder is then added to the mixture of YSZ Powder, carbon black, and PMMA which is then poured into a high shear sigma blade mixer. Water and dispersant are then added while the mixing blades are rotating in order to form an extrudable paste.

The paste is loaded into a ram extruder fitted with a die designed to form the desired tube size. The ram is moved forward and the paste is subjected to a pressure of about 1000 psi to form a green tube which exits the die. After the green tube is formed, the tube is placed on slowly rotating rollers and allowed to dry for 1-2 days. After drying, the tube is cut to size, drilled, and can then be fired from 950-1200° C. for 2-4 hours to achieve reasonable strength for further handling. After firing, the resulting tube can be checked for porosity, permeability/tortuosity and stored in a dry oven at about 60° C.

After firing the green tube, intermediate porous layer 14 is then formed. A mixture of about 30 grams of powders having electronic and ionic phases with the chemical formulas, $(La_{0.8}Sr_{0.2})_{0.95}Cr_{0.7}Fe_{0.25}Co_{0.05}O_{3-\delta}$ (LSCrFCo) and $Zr_{0.802}Sc_{0.180}Y_{0.018}O_{2-\delta}$ (YScZ), respectively, is prepared so that the mixture contains about 60% of LSCrFCo and about 40% of YScZ by volume. To the mixture, 25 grams of toluene, 5 grams of Ferro binder (Product ID B73210), 200 grams of 1.5 mm diameter YSZ grinding media are added. The mixture is then milled for about 6 hours to form a slurry having a particle size $d_{50}$ of about 0.3 μm). About 4.5 grams of carbon black having a particle size of about $d_{50}$ of 0.8 μm and 0.3 grams of surfactant KD-1 dissolved in 15 grams of toluene are then added to the slurry and milled for additional 2 hours. The slurry is then coated by meniscus coating with a coating speed of 6-10 meters per hour on the outer wall of the tube which is then fired at about 1200° C. for 4 hours in air.

The dense layer 10 is then applied to the coated tube. A mixture weighing about 70 grams is prepared that contains the same powders as used in forming the intermediate porous layer 14, discussed above, except that the ratio between LSCrFCo and YScZ is about 50/50 by volume. To this mixture, 170 grams of toluene, 36 grams of the same Ferro binder mentioned above, 1100 grams of 1.5 mm diameter YSZ grinding media are added and the same is milled for about 24 hours to form a slurry having a particle size $d_{50}$ of about 0.3 μm. The formed slurry is then applied as a coating on top of layer 14 also by meniscus coating process with similar coating speed. The tube is then stored dry prior to co-firing the layers 14 and 10 in a controlled environment, as described below.

The coated tube is slowly heated in flowing nitrogen to about 1380° C. and held at the same temperature for about 6 hours for the cobalt containing electronic conducting perovskites to properly sinter. During sintering, the oxygen partial pressure of the atmosphere in the furnace is controlled below 20 Pa. The tube is then cooled in nitrogen to complete the sintering process. The sintered tube is checked for flow coefficient v, as defined below:

$$Cv = \frac{q}{0.471 N_2 p_1 \sqrt{\frac{1}{G_g T_1}}}$$

where q is the flow rate, $N_2$ is a constant, $p_1$ is the inlet pressure, $G_g$ is the gas specific gravity, and $T_1$ is the absolute upstream temperature. The Cv of the sintered tube should not exceed $1.5 \times 10^{-5}$.

Surface exchange layer 16 is then applied. The surface exchange layer 16 has the same compositions and ratio of the electronic and ionic phases as the intermediate porous layer 14, mentioned above. To prepare the slurry, 80 grams of the electronic and ionic mixture, 28.8 grams of toluene, 19.2 grams of ethyl alcohol, 16 grams of the same Ferro binder mentioned above, 1.6 grams of surfactant KD-1, about 500 grams of 1.5 mm diameter YSZ grinding media are added and the resultant mixture is milled for about 2 hours to form a slurry having a particle size $d_{50}$ of about 0.4 μm. About 12 grams of carbon black are added to the slurry and it is milled for additional 2 hours. The slurry is then applied as a coating on top of the sintered dense layer 10 again by meniscus coating with roughly the same coating speed. The coated tube is then dried and fired at 1250° C. for two hours in air. The Cv of the tube after cathode sintering is checked again to make sure no significant change has occurred.

The resultant tubes have the preferred thickness, pore size and porosity within the ranges outlined above, namely, the porous intermediate layer 14 has a thickness of about 15 microns, an average pore size from about 0.1 microns to about 0.5 microns and a porosity from about 25 percent to about 50 percent. Porous support layer 12 has a thickness of about 1 mm, an average pore size from about 1 micron to about 3 microns and a porosity of about 35 percent. The surface exchange layer 16 has a thickness from about 10 microns to about 20 microns, an average pore size from about 0.1 microns to about 0.5 microns and a porosity from about 40 percent to about 60 percent. In one embodiment, dense layer 10 has a thickness from about 10 microns to 20 microns and no connected porosity.

It is to be noted that in one embodiment of the present invention, the particle size of the chromite/zirconia slurry for deposition of the intermediate and dense separation layers 14 and 10 is preferably in a range from about 0.3 microns to about 0.35 microns. Although other particle sizes may be used, membranes fabricated from such slurries with particle sizes in the range from about 0.3 microns to about 0.35 microns indicated minimal reactivity between the two phases and with shrinkage matching the porous zirconia support.

While the invention has been described with respect to a preferred embodiment, as will occur to those skilled in the art, numerous changes, additions and omissions may be made without departing from the spirit and scope of the present invention provided for in the appended claims.

We claim:

1. A composite oxygen ion transport membrane comprising:
   a dense layer having an electronic phase and an ionic phase, wherein the electronic phase comprising $(La_{1-x}Sr_x)_wCr_{1-y-z}Fe_yCo_zO_{3-\delta}$, where x is from about 0.1 to about 0.3, w is from about 0.93 to about 1.0, y is from about 0.15 to about 0.45, z is from about 0.03 to about 0.1, and δ renders the compound charge neutral; and wherein the ionic phase comprises $Zr_{1-x'}Sc_{x'}A_{y'}O_{2-\delta}$, where x' is from about 0.1 to about 0.22, y' is from about 0.01 to about 0.04, and A is Y or Ce or mixtures of Y and Ce; and
   a porous support layer formed of $Zr_{1-x''}A_{x''}O_{2-\delta}$, where x'' is from about 0.05 to about 0.13, A is Y or Sc or Al or Ce or mixtures of Y, Sc, Al, and Ce.

2. The composite ion transport membrane of claim 1, further comprising a porous intermediate layer between the dense layer and the porous support layer wherein the porous intermediate layer is comprised of the electronic phase and the ionic phase.

3. The composite ion transport membrane of claim 2, further comprising:
   a surface exchange layer overlying the dense layer so that the dense layer is located between the surface exchange layer and the porous intermediate layer and wherein the surface exchange layer comprises an electronic conductor and an ionic conductor;
   wherein the electronic conductor of the surface exchange layer further comprises $(La_{1-x'''}Sr_{x'''})_{w'''}Cr_{1-y'''-z'''}Fe_{y'''}Co_{z'''}O_{3-\delta}$, where x''' is from about 0.1 to about 0.3, w''' is from about 0.93 to about 1, y''' is from about 0.25 to about 0.45, z''' is from about 0.03 to about 0.1, and δ of said electronic conductor renders the compound charge neutral; and
   wherein the ionic conductor of the surface exchange layer further comprises $Zr_{1-x^{iv}}Sc_{x^{iv}}A_{y^{iv}}O_{2-\delta}$, where $x^{iv}$ is from about 0.1 to about 0.22, $y^{iv}$ is from about 0.01 to about 0.04, and A is Y or Ce, and δ of said ionic conductor renders the compound charge neutral.

4. The composite ion transport membrane of claim 3, wherein:
   the ionic phase of the dense layer constitutes from about 35 percent to about 65 percent by volume of the dense layer;
   the ionic phase of the intermediate porous layer constitutes from about 35 percent to about 65 percent by volume of the intermediate porous layer; and
   the ionic conductor of the surface exchange layer constitutes from about 35 percent to about 65 percent by volume of the surface exchange layer.

5. The composite ion transport membrane of claim 4, wherein:
   the ionic phase of the dense layer constitutes from about 50 percent to about 65% by volume of the dense layer;
   the ionic phase of the intermediate porous layer constitutes between about 40 percent to 60% by volume of the intermediate porous layer; and
   the ionic conductor of the surface exchange layer constitutes about 40 percent by volume of the surface exchange layer.

6. The composite ion transport membrane of claim 1, wherein:
   the electronic phase of the dense layer is $(La_{0.8}Sr_{0.2})_{0.95}Cr_{0.7}Fe_{0.25}Co_{0.05}O_{3-\delta}$; and
   the ionic phase of the dense layer is $Zr_{0.802}Sc_{0.180}Y_{0.018}O_{2-\delta}$.

7. The composite ion transport membrane of claim 2, wherein:
   the electronic phase of the dense layer and a porous intermediate layer is $(La_{0.8}Sr_{0.2})_{0.95}Cr_{0.7}Fe_{0.25}Co_{0.05}O_{3-\delta}$; and the ionic phase of the dense layer and the porous intermediate layer is $Zr_{0.802}Sc_{0.180}Y_{0.018}O_{2-\delta}$.

8. The composite ion transport membrane of claim 1 wherein said porous support layer further comprises $Zr_{0.923}Y_{0.077}O_{2-\delta}$.

9. The composite ion transport membrane of claim 5, wherein:
   the electronic phase of the dense layer and the porous intermediate layer is $(La_{0.8}Sr_{0.2})_{0.95}Cr_{0.7}Fe_{0.25}Co_{0.05}O_{3-\delta}$;
   the ionic phase of the dense layer and the porous intermediate layer is $Zr_{0.802}Sc_{0.180}Y_{0.018}O_{2-\delta}$;
   the porous support layer further comprises $Zr_{0.923}Y_{0.077}O_{2-\delta}$;
   the electronic conductor of surface exchange layer is $(La_{0.8}Sr_{0.2})_{0.95}Cr_{0.7}Fe_{0.25}Co_{0.05}O_{3-\delta}$; and the ionic conductor of surface exchange layer is $Zr_{0.809}Sc_{0.182}Ce_{0.009}O_{2-\delta}$.

10. The composite ion transport membrane of claim 1, wherein:

- a porous intermediate layer has a thickness from about 10 microns to about 30 microns, an average pore size from about 0.1 microns to about 1 micron, and a porosity from about 25 percent to about 50 percent;
- the porous support layer has a thickness from about 0.7 mm to about 2.5 mm, an average pore size from about 0.5 microns to about 3 microns, and a porosity from about 25 percent to about 50 percent; and
- a surface exchange layer has a thickness from about 10 microns to about 25 microns, an average pore size from about 0.1 microns to about 1 micron, and a porosity from about 25 percent to about 50 percent.

\* \* \* \* \*